United States Patent [19]

Tai

[11] Patent Number: 5,260,807
[45] Date of Patent: Nov. 9, 1993

[54] METHOD AND APPARATUS FOR IMBEDDING CONTROLLED STRUCTURE FOR GRAY SCALE RENDERING

[75] Inventor: Hwai-Tzuu Tai, Rochester, N.Y.

[73] Assignee: Eastman Kodak Company, Rochester, N.Y.

[21] Appl. No.: 895,554

[22] Filed: Jun. 5, 1992

[51] Int. Cl.⁵ .................... H04N 1/40; H04N 1/21
[52] U.S. Cl. ................... 358/456; 358/459; 358/466; 358/298
[58] Field of Search ........... 358/300, 296, 298, 455, 358/456, 458, 459, 462, 465, 466; 346/108, 160

[56] References Cited

U.S. PATENT DOCUMENTS

| | | |
|---|---|---|
| 4,554,593 | 11/1985 | Fox et al. |
| 4,578,713 | 3/1986 | Tsao et al. |
| 4,651,287 | 3/1987 | Tsao |
| 4,654,721 | 3/1987 | Goertzel et al. |
| 4,668,995 | 5/1987 | Chen et al. |
| 4,680,645 | 7/1987 | Dispoto et al. |
| 4,733,230 | 3/1988 | Kurihara et al. |
| 4,814,886 | 3/1989 | Kuge .................. 358/298 |
| 4,890,167 | 12/1989 | Nakazato et al. |
| 4,891,710 | 1/1990 | Nakazato et al. |
| 4,891,714 | 1/1990 | Klees |
| 4,924,322 | 5/1990 | Kurosawa et al. |
| 4,930,018 | 5/1990 | Chan et al. |
| 4,941,038 | 7/1990 | Walowit |
| 4,958,218 | 9/1990 | Katayama et al. |
| 4,965,672 | 10/1990 | Duke et al. |
| 4,969,052 | 11/1990 | Ishida et al. |
| 5,014,333 | 5/1991 | Miller et al. |
| 5,031,050 | 7/1991 | Chan |
| 5,034,990 | 7/1991 | Klees |
| 5,050,000 | 9/1991 | Ng |
| 5,051,841 | 9/1991 | Bowers et al. |
| 5,051,844 | 9/1991 | Sullivan |
| 5,055,942 | 10/1991 | Levien |
| 5,060,284 | 10/1991 | Klees |
| 5,068,914 | 11/1991 | Klees |
| 5,077,812 | 12/1991 | Kanno et al. |

Primary Examiner—Edward L. Coles, Sr.
Assistant Examiner—Scott A. Rogers
Attorney, Agent, or Firm—Norman Rushefsky

[57] ABSTRACT

A method and arrangement for reproducing an original image has a scanner which scans and digitizes the original image into pixels, a controller coupled to the scanner to receive the digitized original image, and a printer coupled to the controller. The controller produces a first signal corresponding to a gray level halftoned representation of the digitized original image, and stabilizes the dots at specified pixels. The printer receives the first signal and reproduces the original image with stable dots at locations corresponding to the specified pixels.

10 Claims, 11 Drawing Sheets

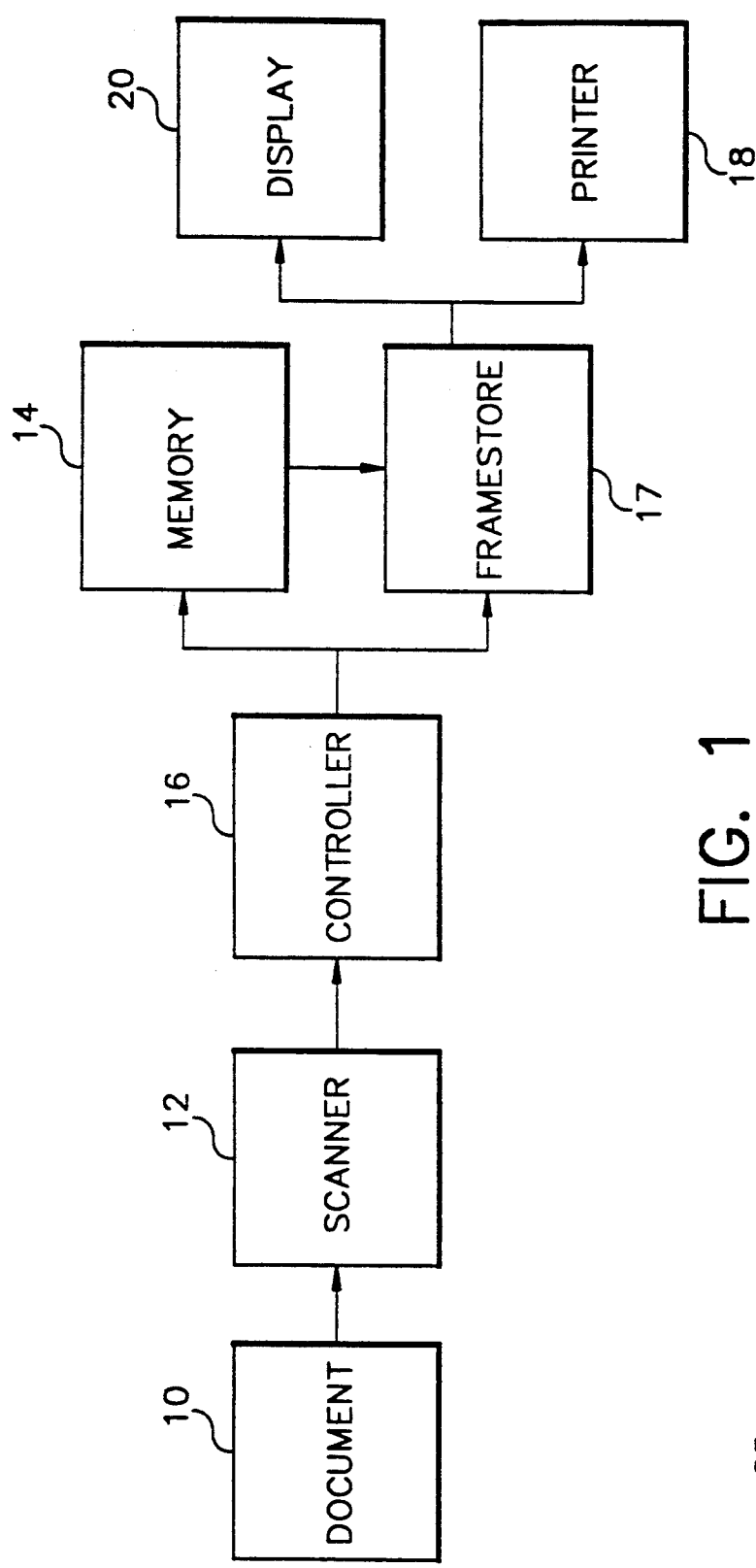

```
30
     LEVEL 1
43   36   22    8
15   ①   29   50
22   [8]  43   36
29   50   15    1

LEVEL 2
44   37   23    9
16    2   30   51
23    9   44   37
30   51   16    2

LEVEL 3
45   38   24   10
17    3   31   52
24   10   45   38
31   52   17    3

LEVEL 4
46   39   25   11
18    4   32   53
25   11   46   39
32   53   18    4
```

```
     LEVEL 5
47   40   26   12
19    5   33   54
26   12   47   40
33   54   19    5

LEVEL 6
48   41   27   13
20    6   34   55
27   13   48   41
34   55   20    6

LEVEL 7
49   42   28   14
21    7   35   56
28   14   49   42
35   56   21    7

```
                    34
                       LEVEL 1                      LEVEL 5
                    7    6    4    2            39   38   36   34
                    3   ①    5    8             35   33   37   40
                    4    2    7    6             36   34   39   38
                    5    8    3    1             37   40   35   33

LEVEL 2                      LEVEL 6
                   15   14   12   10            47   46   44   42
                   11    9   13   16            43   41   45   48
                   12   10   15   14            44   42   47   46
                   13   16   11    9            45   48   43   41

LEVEL 3                      LEVEL 7
                   23   22   20   18            55   54   52   50
                   19   17   21   24            51   49   53   56
                   20   18   23   22            52   50   55   54
                   21   24   19   17            53   56   51   49

LEVEL 4
                   31   30   28   26
                   27   25   29   32
                   28   26   31   30
                   29   32   27   25
```

FIG. 6

| LEVEL 1 | | | | LEVEL 5 | | | |
|---|---|---|---|---|---|---|---|
| 31 | 26 | 16 | 6 | 35 | 30 | 20 | 10 |
| 11 | ① | 21 | 36 | 15 | 5 | 25 | 40 |
| 16 | 6 | 31 | 26 | 20 | 10 | 35 | 30 |
| 21 | 36 | 11 | 1 | 25 | 40 | 15 | 5 |

| LEVEL 2 | | | | LEVEL 6 | | | |
|---|---|---|---|---|---|---|---|
| 32 | 27 | 17 | 7 | 47 | 46 | 44 | 42 |
| 12 | 2 | 22 | 37 | 43 | 41 | 45 | 48 |
| 17 | 7 | 32 | 27 | 44 | 42 | 47 | 46 |
| 22 | 37 | 12 | 2 | 45 | 48 | 43 | 41 |

| LEVEL 3 | | | | LEVEL 7 | | | |
|---|---|---|---|---|---|---|---|
| 33 | 28 | 18 | 8 | 55 | 54 | 52 | 50 |
| 13 | 3 | 23 | 38 | 51 | 49 | 53 | 56 |
| 18 | 8 | 33 | 28 | 52 | 50 | 55 | 54 |
| 23 | 38 | 13 | 3 | 53 | 56 | 51 | 49 |

| LEVEL 4 | | | |
|---|---|---|---|
| 34 | 29 | 19 | 9 |
| 14 | 4 | 24 | 39 |
| 19 | 9 | 34 | 29 |
| 24 | 39 | 14 | 4 |

FIG. 7

| THRESHOLD LEVEL 1 | | | | THRESHOLD LEVEL 6 | | | | THRESHOLD LEVEL 11 | | | |
| --- | --- | --- | --- | --- | --- | --- | --- | --- | --- | --- | --- |
| 56 | 67 | 34 | 12 | 61 | 72 | 39 | 17 | 66 | 77 | 44 | 22 |
| 23 | 1 | 45 | 78 | 28 | 6 | 50 | 83 | 33 | 11 | 55 | 88 |
| 34 | 12 | 56 | 67 | 39 | 17 | 61 | 72 | 44 | 22 | 66 | 77 |
| 45 | 78 | 23 | 1 | 50 | 83 | 28 | 6 | 55 | 88 | 33 | 11 |

| THRESHOLD LEVEL 2 | | | | THRESHOLD LEVEL 7 | | | | THRESHOLD LEVEL 12 | | | |
| --- | --- | --- | --- | --- | --- | --- | --- | --- | --- | --- | --- |
| 57 | 68 | 35 | 13 | 62 | 73 | 40 | 18 | 94 | 95 | 92 | 90 |
| 24 | 2 | 46 | 79 | 29 | 7 | 51 | 84 | 91 | 89 | 93 | 96 |
| 35 | 13 | 57 | 68 | 40 | 18 | 62 | 73 | 92 | 90 | 94 | 95 |
| 46 | 79 | 24 | 2 | 51 | 84 | 29 | 7 | 93 | 96 | 91 | 89 |

| THRESHOLD LEVEL 3 | | | | THRESHOLD LEVEL 8 | | | | THRESHOLD LEVEL 13 | | | |
| --- | --- | --- | --- | --- | --- | --- | --- | --- | --- | --- | --- |
| 58 | 69 | 36 | 14 | 63 | 74 | 41 | 19 | 102 | 103 | 100 | 98 |
| 25 | 3 | 47 | 80 | 30 | 8 | 52 | 85 | 99 | 97 | 101 | 104 |
| 36 | 14 | 58 | 69 | 41 | 19 | 63 | 74 | 100 | 98 | 102 | 103 |
| 47 | 80 | 25 | 3 | 52 | 85 | 30 | 8 | 101 | 104 | 99 | 97 |

| THRESHOLD LEVEL 4 | | | | THRESHOLD LEVEL 9 | | | | THRESHOLD LEVEL 14 | | | |
| --- | --- | --- | --- | --- | --- | --- | --- | --- | --- | --- | --- |
| 59 | 70 | 37 | 15 | 64 | 75 | 42 | 20 | 110 | 111 | 108 | 106 |
| 26 | 4 | 48 | 81 | 31 | 9 | 53 | 86 | 107 | 105 | 109 | 112 |
| 37 | 15 | 59 | 70 | 42 | 20 | 64 | 75 | 108 | 106 | 110 | 111 |
| 48 | 81 | 26 | 4 | 53 | 86 | 31 | 9 | 109 | 112 | 107 | 105 |

| THRESHOLD LEVEL 5 | | | | THRESHOLD LEVEL 10 | | | | THRESHOLD LEVEL 15 | | | |
| --- | --- | --- | --- | --- | --- | --- | --- | --- | --- | --- | --- |
| 60 | 71 | 38 | 16 | 65 | 76 | 43 | 21 | 118 | 119 | 116 | 114 |
| 27 | 5 | 49 | 82 | 32 | 10 | 54 | 87 | 115 | 113 | 117 | 120 |
| 38 | 16 | 60 | 71 | 43 | 21 | 65 | 76 | 116 | 114 | 118 | 119 |
| 49 | 82 | 27 | 5 | 54 | 87 | 32 | 10 | 117 | 120 | 115 | 113 |

FIG. 8

| THRESHOLD LEVEL 1 | | | | THRESHOLD LEVEL 2 | | | | THRESHOLD LEVEL 3 | | | | THRESHOLD LEVEL 4 | | | |
|---|---|---|---|---|---|---|---|---|---|---|---|---|---|---|---|
| 71 | 48 | 107 | 190 | 69 | 47 | 106 | 185 | 66 | 47 | 104 | 179 | 64 | 46 | 103 | 173 |
| 128 | 249 | 89 | 38 | 126 | 243 | 88 | 37 | 124 | 238 | 86 | 35 | 122 | 231 | 84 | 34 |
| 107 | 190 | 71 | 48 | 106 | 185 | 69 | 47 | 104 | 179 | 66 | 47 | 103 | 173 | 64 | 46 |
| 89 | 38 | 128 | 249 | 88 | 37 | 126 | 243 | 86 | 35 | 124 | 238 | 84 | 34 | 122 | 231 |

| THRESHOLD LEVEL 5 | | | | THRESHOLD LEVEL 6 | | | | THRESHOLD LEVEL 7 | | | | THRESHOLD LEVEL 8 | | | |
|---|---|---|---|---|---|---|---|---|---|---|---|---|---|---|---|
| 61 | 45 | 101 | 167 | 59 | 44 | 100 | 161 | 57 | 44 | 98 | 156 | 54 | 43 | 97 | 153 |
| 120 | 224 | 83 | 34 | 118 | 217 | 82 | 33 | 116 | 212 | 80 | 32 | 114 | 209 | 79 | 32 |
| 101 | 167 | 61 | 45 | 100 | 161 | 59 | 44 | 98 | 156 | 57 | 44 | 97 | 153 | 54 | 43 |
| 83 | 34 | 120 | 224 | 82 | 33 | 118 | 217 | 80 | 32 | 116 | 212 | 79 | 32 | 114 | 209 |

| THRESHOLD LEVEL 9 | | | | THRESHOLD LEVEL 10 | | | | THRESHOLD LEVEL 11 | | | | THRESHOLD LEVEL 12 | | | |
|---|---|---|---|---|---|---|---|---|---|---|---|---|---|---|---|
| 53 | 42 | 95 | 151 | 51 | 41 | 94 | 146 | 50 | 40 | 92 | 142 | 49 | 40 | 91 | 135 |
| 113 | 205 | 78 | 31 | 111 | 202 | 77 | 30 | 110 | 198 | 75 | 29 | 108 | 195 | 74 | 28 |
| 95 | 151 | 53 | 42 | 94 | 146 | 51 | 41 | 92 | 142 | 50 | 40 | 91 | 135 | 49 | 40 |
| 78 | 31 | 113 | 205 | 77 | 30 | 111 | 202 | 75 | 29 | 110 | 198 | 74 | 28 | 108 | 195 |

| THRESHOLD LEVEL 13 | | | | THRESHOLD LEVEL 14 | | | | THRESHOLD LEVEL 15 | | | | THRESHOLD LEVEL 16 | | | |
|---|---|---|---|---|---|---|---|---|---|---|---|---|---|---|---|
| 19 | 18 | 22 | 25 | 12 | 12 | 14 | 15 | 9 | 8 | 10 | 11 | | | | |
| 24 | 27 | 20 | 17 | 15 | 16 | 13 | 12 | 11 | 11 | 10 | 8 | | | | |
| 22 | 25 | 19 | 18 | 14 | 15 | 12 | 12 | 10 | 10 | 9 | 8 | | | | |
| 20 | 17 | 24 | 27 | 13 | 12 | 15 | 16 | 10 | 8 | 11 | 11 | | | | |

FIG. 13

# METHOD AND APPARATUS FOR IMBEDDING CONTROLLED STRUCTURE FOR GRAY SCALE RENDERING

This invention is related to the following applications, filed on even date with the present application: Ser. No. 07/894,858, for Classification to Change Exposure Within a Cell of Different Pixels; Ser. No. 07/894,857, for Halftone Dot Arrangement in Gray Level Halftone Printing; Ser. No. 07/894,859, for A Method and Arrangement For Providing a Default Mode in Digital Copying; Ser. No. 07/895,555, for A Method and Arrangement For Locally Switching Gray Dot Types to Reproduce an Image With Gray Level Printing; Ser. No. 07/895,986, for An Image Processing Method to Remove Halftone Screens; Ser. No. 07/895,985, for Multi-Bit Rendering Method and Arrangement for Continuous Tone Picture Representation and Printing; and Ser. No. 07/895,988, for Line Screen Design for Gray Scale Rendering. Each of these related applications is hereby expressly incorporated by reference into this application.

FIELD OF THE INVENTION

The present invention relates to the field of encoding pictorial imagery for reproduction on display or printing systems, and more particularly, to the imbedding of a controlled structure in gray scale rendering to provide more pleasing reproductions of images.

BACKGROUND OF THE INVENTION

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a j×k matrix of sub-elements where j and k are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel. See, for example, U.S. Pat. No. 4,680,645 for a method of rendering gray scale images with variable dot sizes.

There are two major concerns in rendering a continuous tone image for printing: (1) the resolution of image details, and (2) the reproduction of gray scales. In a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes from one dot-size of 1 bit/pixel to 16 different dot-sizes of 4 bit/pixel. An image could then be rendered with 133 line screens and 128 gray scales of higher quality image. Although providing higher image quality with respect to line resolution and tonal scales, gray level halftoning presents its own dot rendering issues.

A problem exists in the application of a gray level rendering technique to a document that contains different types of images: text, halftone, and continuous tone. These different types of images create different rendering problems, based on a trade-off between tone scales and detail resolution. For example, with text, the number of tone scales is not as important as providing a smooth text edge, whereas the opposite holds true for continuous tone images. Providing a single type of gray level halftone rendering technique to a document that contains two or more types of images may lead to the production of a document in which one or more of the different types of images are reproduced unsatisfactorily. Accordingly, a number of different dot designs are possible, the different dot designs having various advantages and disadvantages.

In electrophotography, the toning process is based on the differential electrostatic force generated by the charge potential on the latent image. A well formed cluster type of charge-potential-well is therefore advantageous for developing a stable dot. Certain dot designs have a well formed potential well already built in, so that the rendered images will be less grainy. However, certain other dot designs will render a grainy image because there is no such well formed charge-potential-well for that dot structure on the latent image to stabilize the dot.

There is a need for an apparatus and method for providing a stable dot for a dot design that would normally not have a stable dot developed in the electrophotographic printing process

SUMMARY OF THE INVENTION

This and other needs are met by the present invention which provides an arrangement for reproducing an original image has a scanner which scans and digitizes the original image into pixels, a controller coupled to the scanner to receive the digitized original image, and a printer coupled to the controller. The controller produces a first signal corresponding to a gray level halftoned representation of the digitized original image, and stabilizes the dots at specified pixels. The printer receives the first signal and reproduces the original image with stable dots at locations corresponding to the specified pixels.

The earlier stated needs are also met by the present invention which provides a method of reproducing an original image which includes the steps of scanning and digitizing an original image to produce a digitized image divided into pixels, modifying the digitized image such that specified pixels will be printed with stable dots, diffusing error, created by modifying the digitized image, to those pixels neighboring the specified pixels, and printing the modified digitized image after the error has been diffused.

With the apparatus and method of the present invention, imbedded controlled dot structure can be provided so that a stabilized dot is formed. This will make the reproduced images less grainy for dot design structures that do not normally have a stable dot structure when reproduced.

Other objects, advantages and novel features of the present invention will become apparent from the following detailed description of the invention when considered in conjunction with the accompanying drawings.

BRIEF DESCRIPTION OF THE DRAWINGS

FIG. 1 shows a block diagram of an arrangement for reproducing an image, constructed in accordance with an embodiment of the present invention.

FIG. 2 shows an example of a 4×4 cell with indications of gray level for each pixel.

FIG. 3 illustrates an exemplary 3-bit gray halftone dot layout according to a full dot type embodiment of the present invention.

FIG. 6 shows a 3-bit gray halftone dot layout according to a partial dot type embodiment of the present invention.

FIG. 7 shows a 3-bit gray halftone dot layout according to a mixed dot type embodiment of the present invention.

FIG. 8 shows a 4-bit gray halftone dot layout according to a mixed dot type embodiment of the present invention.

FIG. 13 illustrates a thresholding mask pattern for the mixed dot type pattern of FIG. 8.

DETAILED DESCRIPTION OF THE DRAWINGS

Figures 4, 5:
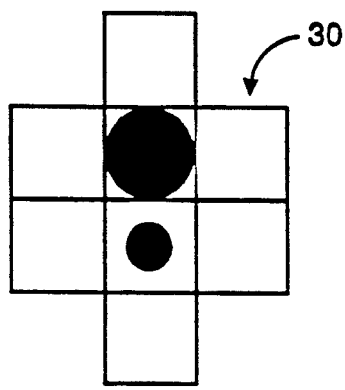
FIG. 4 shows a cell with dots that have been formed.
FIG. 5 illustrates an exemplary halftone dot mask.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17 to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the framestore 17, the printer 18 and the display 20 are of conventional hardware design.

In gray level printing, each pixel has the capability to render several different dot sizes, and thus different gray levels. However, instead of simply providing each pixel with an independent gray level, several pixels may be organized together to form a superpixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels can be provided with gray level printing for each pixel in a cell (3 bits/pixel). When the cell is made up of 4×4 pixels, for example, the gray level printing allows 121 different gray shades to be rendered for that cell. An example of a 4×4 cell 28 with numbers that represent gray levels for each pixel is shown in FIG. 2.

The formation of the dots in the pixels of a cell can be performed in a number of different manners to achieve different desired results. The dots can be formed as "full" dot, "partial" dot, or "mixed" dot to provide gray level halftoning.

FIG. 3 illustrates an example of a 3-bit gray halftone dot layout for a full dot type formation. Also illustrated are seven different pixel-dot sizes, corresponding to the sizes that each individual pixel-dot can obtain. There are 57 possible gray levels for the exemplary eight element cell 30 shown here. An example of the formation of a cell that is at gray level 12 will now be given.

The pixel circled in level 1, reference numeral 1, is formed to dot-size 1 in level 1. (Only one cell will be described, although the pixels of other cells will be changed according to the same layout, as shown in FIG. 3). The dot at this pixel grows larger and larger as the levels increase from level 1 to level 2 all the way to level 7. One can see that this circled pixel increases in value from 1 to 7 as the levels increase. If the desired gray level for the cell 30 was 7, then the formation of dots would be completed once the circled pixel has reached the dot-size of 7 in level 7. In this example, however, the gray level for the cell 30 is desired to be 12. At gray level 7, the circled pixel has reached its maximum dot-size, so that a dot at another pixel must now start forming. This dot starts forming at the pixel indicated with a square around it in level 1, with the numeral 8.

The dot formation process continues, with the dot at this second pixel growing larger and larger as the levels again increase from level 1 to level 5. The formation process stops at level 5, since the cell has now reached the value of 12. The halftone cell 30 now contains, as seen in FIG. 4, a dot of dot-size 7, and a dot of dot-size 5. The extension of this formation process to 57 gray levels is easy to see from this example.

The full dot type process thus involves forming dots at the highest priority pixels to their maximum allowable dot-size before beginning the formation of the dots at the next highest priority pixels. An exemplary halftone dot mask 32 with pixel priorities indicated is shown in FIG. 5. Different matrix sizes, cell shapes and priorities can be used for the cells than that illustrated in FIG. 3, without departing from the spirit and scope of the present invention.

In the electrophotographic process, the full dot type formation process is favored because it forms stable dots and exhibits less granularity (halftone printing noise). Another method which carries more information detail than full dot, but at the cost of less stable dots, is the partial dot type, described below.

A 3-bit gray halftone dot layout for the partial dot type formation process is shown in FIG. 6. In this process, the cell 34 is built by providing a dot of the same size to each pixel in the cell to the extent possible, before building up the dot at any particular pixel to the next larger size. Thus, for a gray level of 6 for the cell 34, the circled pixel in level 1 would have a dot formed at that pixel with a dot-size of 1. For larger gray levels, for example gray level 13, each of the pixels in the cell 34 would be built up to at least dot-size of 1. The pixels indicated with a square around them in level 2 would be built up to have a dot-size of 2.

The partial dot formation process can thus be seen to spread out the information over the cell, and therefore carries more information detail than the full dot. It does suffer from less stable dots and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

An example of a specific mixed dot type 3-bit gray halftone dot layout is illustrated in FIG. 7. As can be seen, until gray level 41 is reached, the pixels are constrained from growing beyond dot-size of 5. The pixels grow in a full dot type process, with the pixel circled growing to a dot-size of 5, with the pixel that is squared then starting to grow in size. Once all of the pixels in the cell have attained a dot-size of 5, corresponding to gray level 40, the cell then increases in gray level by using a partial dot type process. In other words, each of the pixels in the cell must grow to a dot-size of 6 before any of the pixels begins growing to a dot-size of 7.

An example of a 4-bit gray halftone dot layout for mixed dot type is illustrate 8. The formation of the dots is the same in concept to that illustrated in FIG. 7. Because there are 15 dot sizes available for each pixel, 121 gray levels for an eight element cell are obtainable.

The electrophotographic printing process involves: charging, exposure, developing (or toning), transfer, and image fixing stages. Due to its unique toning process which is based on the differential electrostatic force generated by the charge potential on the latent image, a well formed cluster type of charge-potential-well is advantageous for developing a stable dot. Such a well formed potential-well is already built in to the mixed-dot and the full dot types of dot designs described above. Hence, the rendered images are visually less grainy. However, it is not true as an image rendered through the partial dot structure. The image looks grainy. This is because there is no such well formed charge-potential-well for the partial dot structure on the latent image to stabilize the dot. There is a similar effect in error diffused gray scaled images. Therefore, an imbedded controlled dot structure in error diffused gray scale image or partial dot rendered image will stabilize the dot. Furthermore, the imbedded structure can be in either dot form or line form. The rendered images are more pleasing with the controlled structures added in.

The present invention uses an error diffusion algorithm, for example, in one method of imbedding dot structure in gray scale images during the rendering process. A number of known different error diffusion algorithms could be used in the present invention, such as shown in "An Adaptive Algorithm for Spatial Gray Scale", by Flord & Steinberg, Proc. SID, vol. 17/2, pp. 75-77 and "Digital Halftoning", by Ulichney. Accordingly, the specifics of an error diffusion algorithm will not be further described here.

Figure 9:
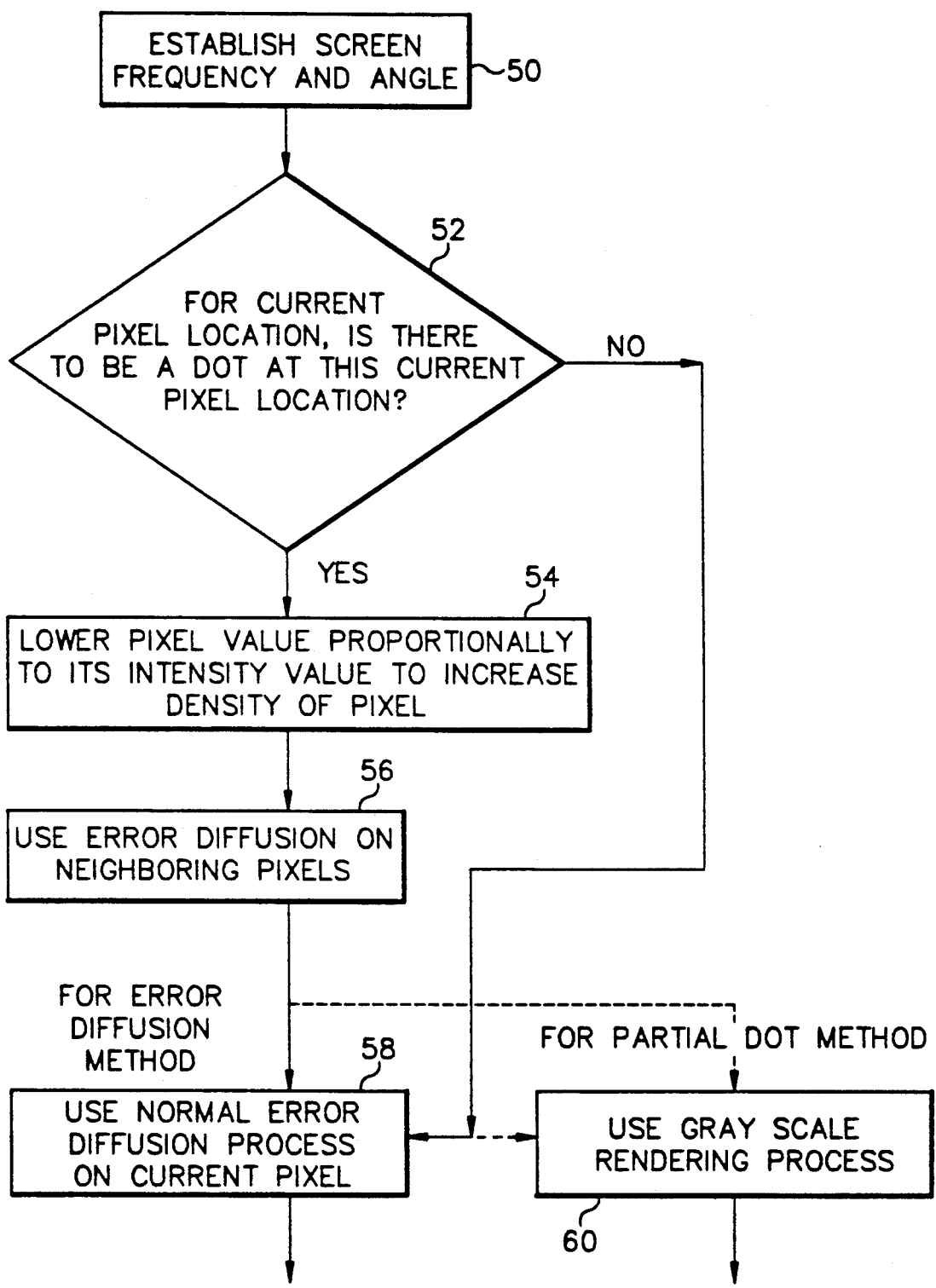
FIG. 9 is a flow chart of a method for imbedding dot structure in accordance with an embodiment of the present invention.

In the first step (50 in FIG. 9) of the method of the present invention, the screen frequency and the angle are determined in order to decide what are the imbedded dot structures, i.e., which dots are the dots which will be stabilized. This can be as simple as a periodic screen structure in dot or line form. The structure could be, for example, 45 degree lines with 141 lines-per-inch screens at 400 dpi resolution. Hence, when the current pixel is along these lines, this dot is determined to be a dot that is to be stabilized. Such a determination of pixels that will be stabilized is easy to perform in pixel processing. The imposed screen structure can be selected by a designer, but should not be distracting when viewing. Therefore, the periodicity or a template can be determined that is similar to the dot design procedure of a normal halftoning method.

In the next step (52), during the error diffusion process, it is determined for a corresponding location on the template of a current pixel whether a controlled dot should be laid down or not. If a controlled dot should be laid down, the current pixel value will be lowered proportionally according to its intensity value. Otherwise, it will proceed normally as error diffusion does by jumping to step 58 and use the normal error diffusion process on the current pixel. With the partial dot method (shown in dashed lines), if a controlled dot should not be laid down, step 60 is performed so that a gray scale rendering process such as that shown in FIG. 10 (described later) is used on the current pixel.

The purpose of the adjustment on those specific locations is that on this current pixel, more light will be exposed (i.e., the pixel-dot will be slightly darker in the Neg/Pos process) than its original. This current pixel then will act as a stabilized center for the neighboring rendered pixels. The amount of adjustment on each pixel can be determined experimentally from the process latitude (i.e., it may be adjusted in two or few more exposure steps on those specific locations according to the process). The amount of adjustment is dependent on the process conditions such as the toner size, developing potential, photoconductor characteristics, etc. Since the main factor in the toning and transfer process is the electrostatic force mechanism, a larger potential difference created between the pixels is advantageous to stabilize the developing dot and provide an easier transfer.

Experimentation by the inventors has indicated that a 3 to 6 exposure level difference stabilizes the developed dots. Also, the difference of the exposure level may vary with respect to exposures so that a larger difference of exposure is set at lower exposures. For example, if the mean exposure is at level 3 or 4, the controlled pixels should be adjusted to exposure level 9 or 10. However, when the mean exposure is at level 9 or 10, the controlled pixels should be adjusted only to exposure level 11 or 12.

As the error diffusion process continues, in step 54, the further introduced error on that specific (the current) pixel will then be distributed to its neighborhood pixels to balance the specific pixel. Since this adjustment will not change the total tone value but redistributes it as the error diffusion does, the imbedded dot structure is carried naturally in the gray scale error diffusion image. This added dot structure provides a stabilized center on the latent image and improves the toning development process in the electrophotographic printing.

Similarly, this imbedded controlled dot structure can be utilized for other dot structures without a stable dot center in the image.

Figure 11:
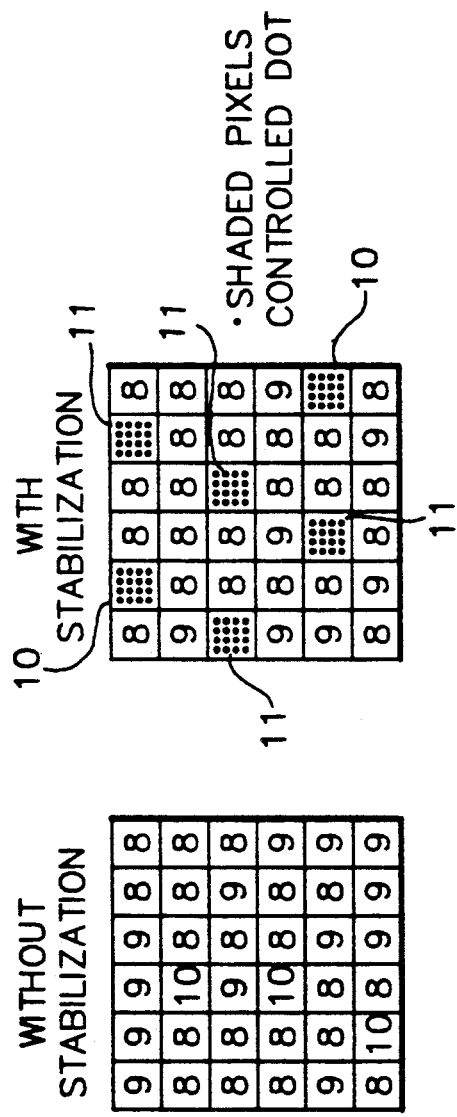
FIG. 11 illustrates a cell before and after dot stabilization according to the present invention.

An example of a 6×6 cell subjected to gray scale error diffusion according to the present invention is illustrated in FIG. 11. The shaded pixels, with higher exposure levels, are the controlled pixels that are to be stabilized. In the 6×6 cell shown on the left without stabilization, there are no large exposure differences among the pixels. The exposure at each pixel is scattered among levels 8, 9 and 10, so that there is no well formed structure in the cell.

By contrast, the cell on the right of FIG. 11 after dot stabilization provides a stable dot structure for developing the flat field, and appears as a screen imposed on top of the 6×6 cell.

Figure 10:
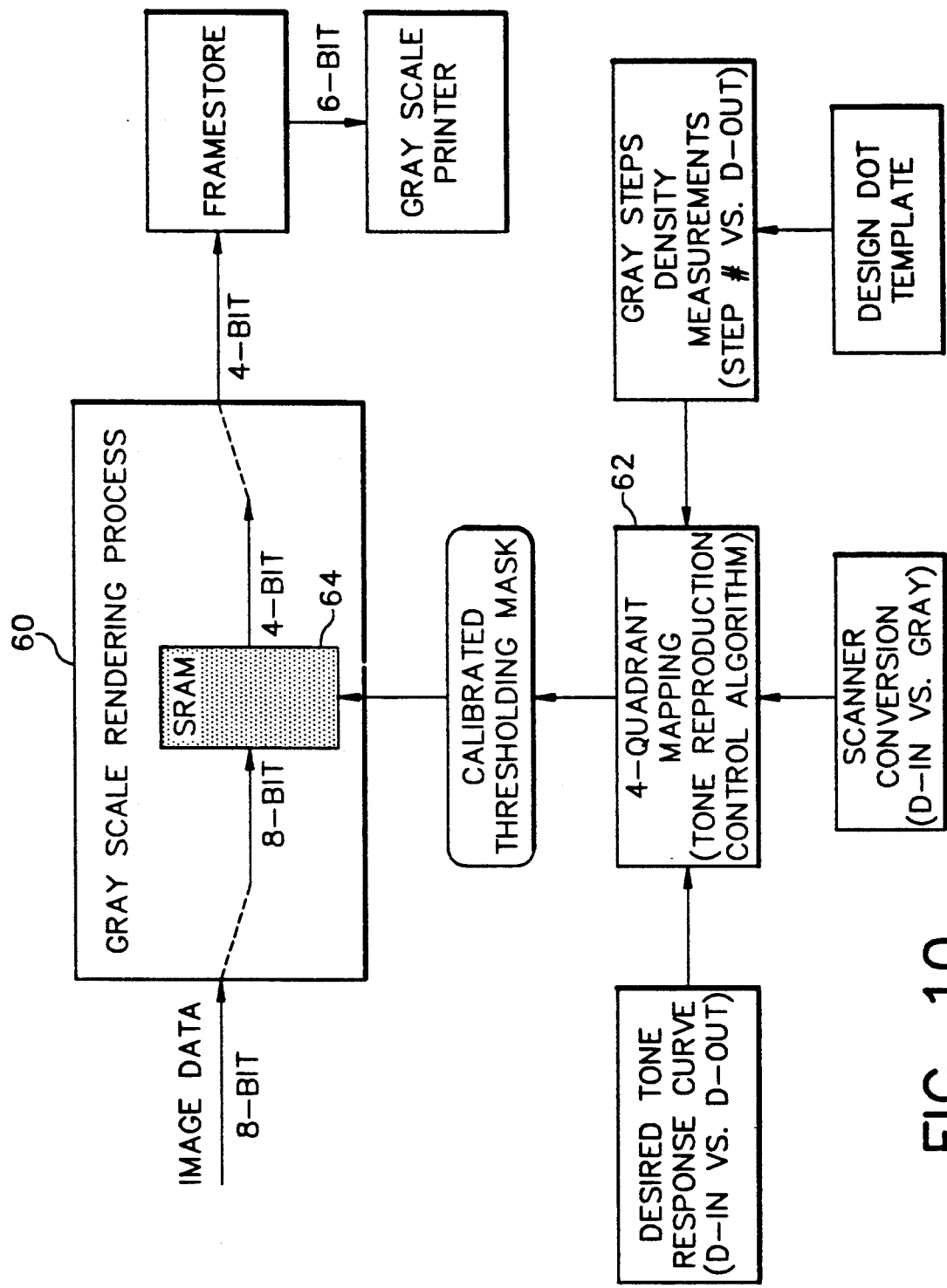
FIG. 10 illustrates a gray scale rendering process.

A simplified block diagram illustrating the gray scale rendering process is provided in FIG. 10. Eight-bit image data is input to the digital halftone process block 60, which also receives signals relating to a calibrated thresholding mask that is created. The tone reproduction block 62 performs the 4-quadrant mapping illustrated in FIG. 12 to create a threshold pattern such as shown in FIG. 13 and described below. The tone reproduction block receives as inputs the desired tone response curve, the gray steps density measurements, and the scanner conversion, and generates a mapping from step number to gray code value output as the calibrated thresholding mask.

The digital halftoning process block 60 converts the input pixel value into output exposure levels through the thresholding value setting at each pixel location in the cell. This can be implemented by a SRAM 64 lookup table that receives the thresholding mask. An image with a reduced bit-depth of four bits is the output of the digital halftoning process block 60. This -4-bit image is provided to a framestore and can then be printed by a 6-bit gray scale printer. (Other information, such as 2-bit pixel classification information, can be added to the 4-bit image data from the framestore.)

Figure 12:
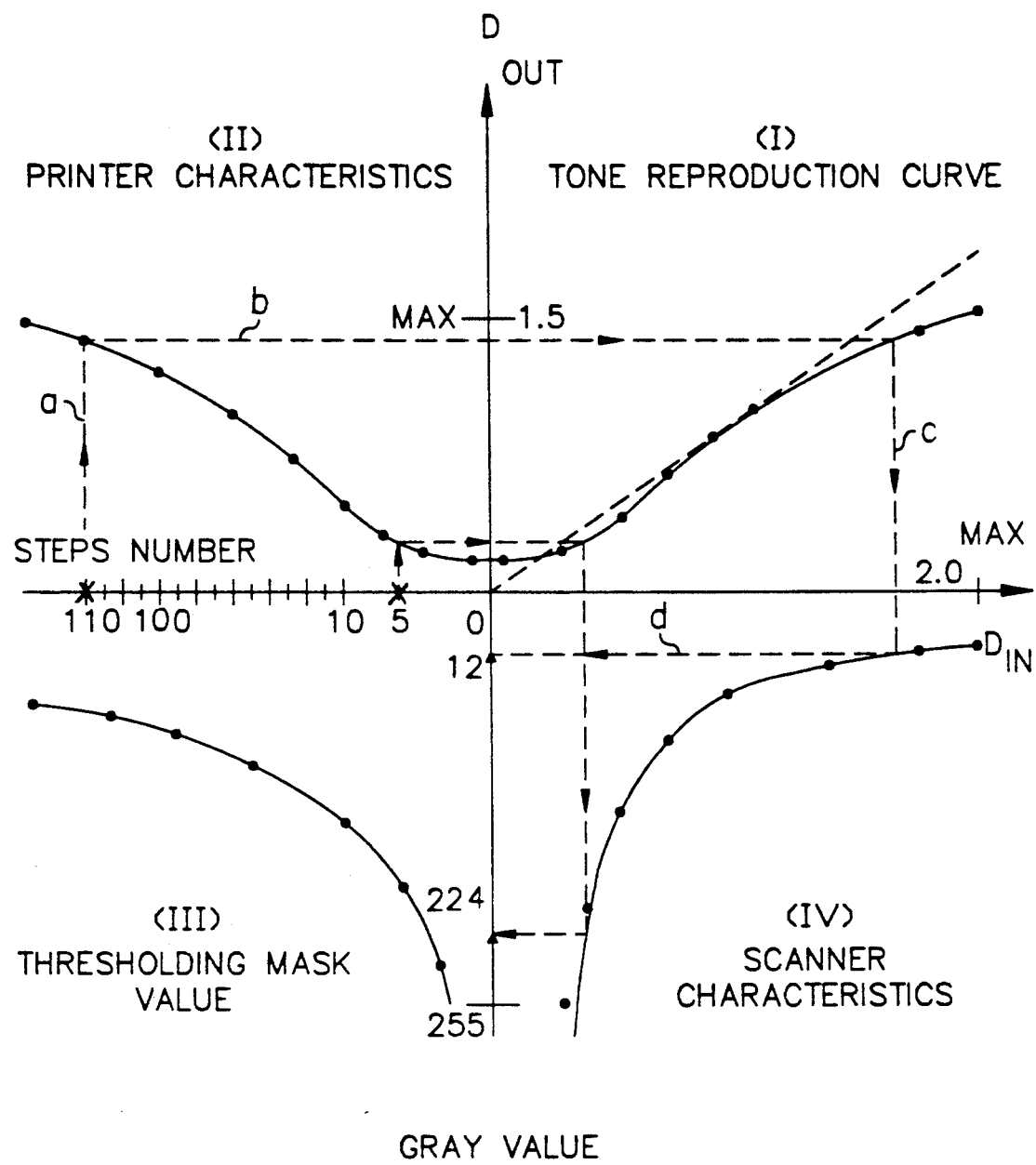
FIG. 12 shows a 4-quadrant tone reproduction chart.

The generation of a threshold mask will now be described. A 4-bit mixed dot type thresholding mask is illustrated in FIG. 13. This thresholding mask is derived from a dot layout, such as shown in FIG. 8 for the mixed dot type, using the tone reproduction control chart, such as shown in FIG. 12. The tone reproduction chart has four quadrants. The first quadrant (I) contains the input and output density of a specific tone reproduction curve, which specifies the gamma or the contrast of the image to be reproduced. The second quadrant (II) captures the characteristics of the gray level printing process. The fourth quadrant (IV) preserves the characteristics of the scanner, which converts the density to a gray value. The third quadrant (III) maps gray values into gray steps linking the quadrants IV, I and II together.

To determine a thresholding mask value using this chart, the step number of the dot sequence in the dot layout of a cell is replaced by a gray value. For example, for step number 110 (found in threshold level 14 of FIG. 8 for the mixed dot type) the mapping along arrows a, b, c, and d provides the gray value of 12. Similarly, for step number 5, the gray value maps to 224. (The values of the step number and the gray values are inversely related). In this manner, the thresholding masks of FIG. 13 is derived.

The thresholding mask is used to determine what the gray level of an output pixel should be given corresponding to its input pixel gray value. Assume, for example, that the input image pixel at location (1,1) of the 4×4 matrix cell of FIG. 13 has a gray value of 56. The 15 thresholding values at the (1,1) location of the 4×4 cell are:

71, 69, 66, 64, 61, 59, 57, 54, 53, 51, 50, 49, 19, 12, and 9.

Since the input image pixel has a gray value of 56, which is between the two threshold values 57 and 54, the output gray level 7 is given to that pixel.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An apparatus for reproducing an original image, comprising:
   a scanner which scans the original image and generates first signals representing said original image as pixels of different gray level values;
   a controller coupled to the scanner and responsive to the first signals, and which generates second signals corresponding to a gray level halftoned representation of the original image; and
   a printer coupled to the controller to receive said second signals and which produces a gray level halftoned reproduction of the original image; and
   wherein the controller includes means for defining a criteria for stable pixel locations in accordance with a screen frequency and screen angle of the image to be reproduced and for determining in accordance with said criteria whether or not there is to be a stable dot at a current pixel and if the current pixel is determined to be at a location meeting said criteria for a stable pixel location, alters a gray level value of the current pixel to increase the density of the current pixel for stabilizing said pixel at said location and diffuses error introduced by increasing the density of the current pixel to pixels that neighbor the current pixel.

2. A method of reproducing an original image, comprising:

scanning an original image to produce first signals representing said original image divided into pixels of varying intensity values;

in accordance with a criterion based on screen frequency identifying a current pixel as a preferred pixel location for formation of a stable dot;

modifying the intensity values of some of said pixels by introducing errors to intensity values of pixels at such preferred locations such that pixels along screen lines have a greater likelihood to be printed with stable dots than pixels not at such preferred locations;

diffusing errors, created by modifying the intensity values of pixels at such preferred locations, to pixels neighboring the pixels at said preferred locations; and printing the modified image with a gray level printer after the error has been diffused.

3. The method of claim 2, and including the step of comparing each current pixel's modified intensity value with a threshold value forming a part of a matrix of partial dot threshold values to determine a gray level value for printing said current pixel.

4. The method of claim 3 and including the step of printing dots with an electrophotographic printing process.

5. The method of claim 2 and including the step of printing dots with an electrophotographic printing process.

6. The method of claim 3, wherein the step of modifying includes adjusting an intensity value of a pixel at a preferred location in accordance with a factor related to the pixel's intensity value to increase a density of the specified pixel when printed.

7. A method of reproducing an original image comprising the steps of:

generating first signals representing an original image divided into pixels of varying intensity values;

in accordance with a criterion based on screen frequency, identifying a current pixel as being a preferred pixel for forming of a stable dot if the current pixel meets said criterion;

in response to a current pixel being identified as a preferred pixel introducing an error to adjust the intensity value of the current pixel to form a modified intensity value;

comparing the modified intensity value with a threshold value; and as a result of said comparing step defining a grey level value for printing the current pixel; and distributing the error to adjust intensity values of pixels neighboring a preferred pixel that are not preferred pixels.

8. The method of claim 7 and including the step of printing dots with an electrophotographic printing process in accordance with defined grey level values for respective pixels.

9. The method of claim 7 and in the step of comparing there is compared each current pixel's modified intensity value with a threshold value forming a part of a matrix of partial dot threshold values to determine a grey level value for printing said current pixel.

10. The method of claim 7, wherein the step of introducing an error includes adjusting an intensity value of a preferred pixel in accordance with a factor related to the pixel's intensity value to increase a density of the specified pixel when printed.

* * * * *